Nov. 28, 1967   H. A. ÅKE WALLGREN   3,354,909

VALVE STRUCTURE

Filed Feb. 10, 1965

INVENTOR
Harald Anton Åke Wallgren
BY
HIS ATTORNEY

United States Patent Office 3,354,909
Patented Nov. 28, 1967

3,354,909
VALVE STRUCTURE
Harald Anton Ake Wallgren, Alvsjo, Sweden, assignor to Aktiebolaget Electrolux, Stockholm, Sweden, a corporation of Sweden
Filed Feb. 10, 1965, Ser. No. 431,498
Claims priority, application Sweden, Feb. 13, 1964, 1,757/64
2 Claims. (Cl. 137—612.1)

ABSTRACT OF THE DISCLOSURE

A hollow cylindrical member providing a space with a liquid inlet at a first end, a first liquid outlet intermediate its ends and a second liquid outlet at its opposite second end, a separate ring having a first flange at its periphery secured to a straight section of the cylindrical member at the second end thereof and a second flange extending radially inward from the first flange and having an opening forming the second outlet, the inner face of the second flange providing a seat for a valve when it is in its closed position, a fixture for pivotally mounting the valve for movement within the space to control the flow of liquid through the first and second outlets, and the fixture and ring having cooperating parts with the ring part formed to receive and hold the fixture part when the latter is moved sideways with respect to the ring part.

---

My invention relates to valve structure.

It has already been proposed to provide valve structure comprising a housing provided with a wall having a curved wall section defining an inwardly facing valve seat at an opening therein, and a valve member within the housing which is angularly movable toward and from the inwardly facing seat, the valve member being pivotally mounted for such angular movement by a hinge having a part thereof formed by the curved wall section at the vicinity of the opening. This construction has the disadvantage that the housing must be shaped at the vicinity of the opening to provide the inwardly facing valve seat. Also, since the curved wall section forms a component part of the hinge for the valve member, this necessitates providing a relatively complicated hinge connection for the valve member.

The object of my invention is to provide a valve structure of this type in which it is not necessary to form a curved wall section at the opening of the housing, and to provide a fabricated construction which is simple and inexpensive to manufacture.

Further objects and advantages of the invention will become apparent as the following description proceeds, and the features of novelty which characterize the invention will be pointed out with particularity in the claims annexed to and forming a part of this specification.

Figure 1:
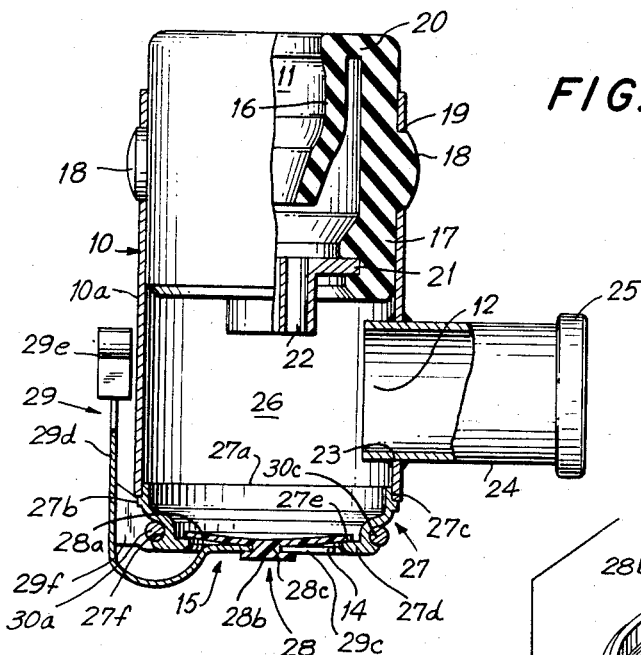
Figure 3:
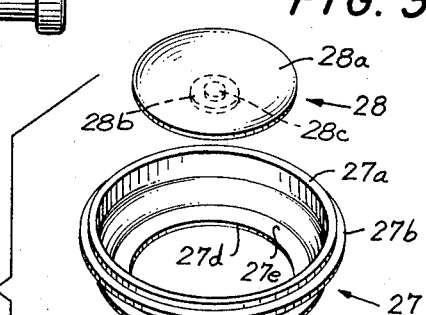
Figure 2:
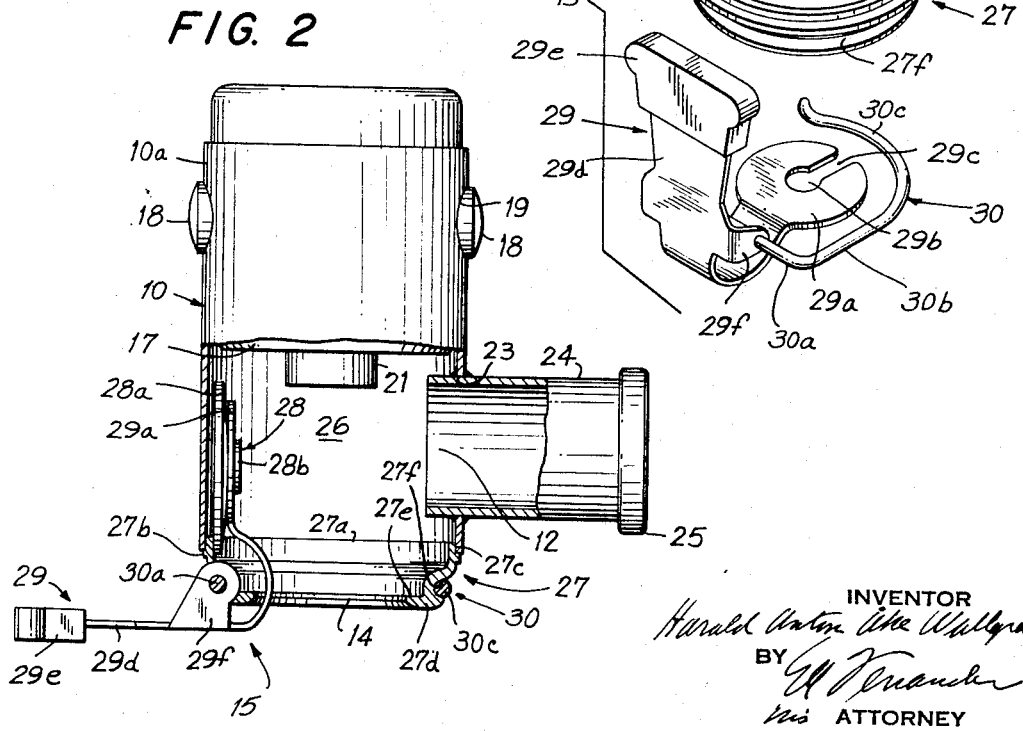

In the drawing, FIG. 1 is an elevation view, partly broken away, of valve structure embodying my invention; FIG. 2 is an elevation view, partly broken away, of the valve structure shown in FIG. 1, in which the valve member is illustrated in its open position; and FIG. 3 is an exploded perspective view of details of the valve member shown in FIGS. 1 and 2.

Referring to FIGS. 1 and 2, I have shown my invention embodied in valve structure comprising a housing 10 having a liquid inlet 11, a first outlet 12 from which liquid may flow in a first path to a place of use, a second outlet 14 through which liquid diverted from the place of use flows in a second path, and a manually movable valve member 15 for regulating the liquid discharged through the second outlet 14 and diverted from the first path of flow.

The inlet 11 and second outlet 14 are respectively disposed at the top and bottom of the housing 10 and in vertical alignment with one another, the first outlet 12 is provided at the wall of the housing between the second outlet 14 and the inlet 11 which is formed to be detachably connected to a water faucet or like fixture, and the manually movable valve member 15 is pivotally mounted on the bottom of the housing.

The liquid inlet 11 is defined by an inner re-entrant sleeve 16 of a tubular member 17 which is resilient and formed with diametrically opposed raised portions or buttons 18 at its outer surface which fit snugly in openings 19 formed in the upright wall of the housing which is cylindrical. The inner sleeve 16, outer tubular member 17 and buttons 18 desirably are formed from a single body of material and integral with one another. The inner sleeve 16 is connected at 20 to the upper end of the tubular member 17 which projects upward from the top edge of the housing 10. The bottom part of the inner sleeve 16 tapers toward its extreme lower end to form a flexible neck adapted to be detachably connected to a water faucet or like fixture.

The sleeve 16, tubular member 17 and buttons 18 may be formed of an elastomeric material which may be any suitable resilient substance such as natural or synthetic rubber, or plastic. The tubular member 17 extends below the inner sleeve 16 and is formed to receive and hold a disk 21 having a plurality of openings or passages 22 therein.

Below the disk 21 the wall of housing 10 is provided with an opening 23 which defines the outlet 12 and at which region is fixed the inner end of a hollow tubular member 24 whose outer beaded end 25 is adapted to be connected to a domestic appliance like a washing machine or dishwasher, for example. When the inlet 11 is connected to a source of supply of water and valve member 15 is in its closed position illustrated in FIG. 1, the water flows through the openings 22 in the disk 21 into a chamber 26 in the housing 10 and from the latter through the outlet 12 to a place of use, the axis of the outlet 12 being at a right angle or normal to the longitudinal axis of the housing 10. When the valve member 15 is moved from its closed position illustrated in FIG. 1, water normally flowing through the outlet 12 is diverted from the place of use and is discharged through the outlet 14.

In accordance with my invention the housing 10 comprises a cylindrical member or hollow sleeve 10a and the valve member 15 is mounted on a ring-shaped element or collar 27 which is fixed to the lower end of the hollow sleeve 10a. The collar essentially is L-shaped in section and includes an upwardly extending first flange 27a of annular form which telescopically fits within the lower end of the sleeve 10a and is formed with an external shoulder 27b against which the lower end of the sleeve bears to limit the telescopic relation of the first flange 27a and the straight wall section of the cylindrical member 10a at the vicinity of the second outlet 14. The first flange 27a of the collar may be fixed at 27c to the lower end of the sleeve 10a in any suitable manner, as by brazing, for example.

The collar 27 includes an inwardly extending flange 27d which defines the second outlet 14 and the top surface 27e of which functions as a valve seat for a disk-shaped valve 28a forming part of a resilient element 28. The bottom side of the resilient element 28 is provided with a button or gripping part 28b which is connected to the disk-shaped valve 28a by a neck portion 28c of reduced cross-sectional area.

The resilient element 28 is detachably mounted on a disk 29a having a central opening 29b and a slot 29c extending radially outward therefrom to the peripheral edge of the disk. The resilient element 28 is positioned on and removed from the disk 29a by moving the neck portion 28c radially inward and outward, respectfully, through the slot 29c, the diameter of the neck portion 28c being slightly greater than the width of the slot 29c. In this way the resilient element 28 is held fast to the disk 29a after it is positioned thereon with the neck portion 28c of the resilient element 28 extending through the opening 29b in the disk.

The disk 29a forms one arm of an L-shaped part 29, the other arm 29d of which serves as a handle or lever provided with a hand grip 29e. The arm 29d is formed with spaced ears or brackets 29f which are apertured to receive an end section 30a of a U-shaped element or fixture 30. The intermediate or closed end 30b of the U-shaped element 30 is essentially straight and the opposite end section 30c is curved, as shown in FIG. 3. The element or fixture 30, which may be formed of relatively stiff wire and is resilient in character, is frictionally held in a groove 27f of annular form at the outer surface of the collar 27. The relatively stiff wire of the fixture 30 constitutes a first part and the groove 27f of the ring-shaped element 27 constitutes a second part which is formed to receive and hold the first part of the fixture 30 when the first part is moved sideways with respect to the second part 27f.

It will now be understood that the valve member 15 comprises the resilient element 28 and the disk 29a to which the resilient element 28 is detachably fixed and readily positioned on and removed therefrom. The collar 27 is fixed at 27c to the lower end of an essentially straight hollow pipe section or sleeve 10a and includes an inwardly extending flange 27d having a top face 27e providing an inwardly facing seat for the valve disk 29a.

The disk 29a in turn forms one arm of the L-shaped part 29, the other arm 29d of which functions as a handle for manually moving the valve member 15 between its closed position and open position shown in FIGS. 1 and 2, respectively. The hand grip 29e functions as a counterweight to hold the valve member 15 in its vertical open position illustrated in FIG. 2.

Although I have shown and described a single embodiment of my invention, I do not wish to be limited to the particular arrangement set forth, and I intend in the following claims to cover all modifications which do not depart from the spirit and scope of my invention.

I claim:

1. Valve structure of the class described for controlling flow of liquid from a source of supply under pressure to first and second places having, in combination,
    (a) a housing having an inlet for liquid adapted to be connected to the source of supply under pressure, said housing defining a space having a first outlet through which liquid supplied to the inlet is adapted to flow from the space to the first place and a second outlet through which liquid supplied to the inlet is adapted to flow from the space to the second place,
    (b) the housing comprising a hollow cylindrical member in the form of a sleeve having the inlet at one end thereof and the second outlet at the opposite end thereof, said cylindrical member having an opening between the inlet and the second outlet which defines the first outlet,
    (c) the hollow cylindrical member comprising a straight wall section having an extreme end terminating at the opposite end thereof at the second outlet,
    (d) a separate ring-shaped element which is L-shaped in section and has an opening therein, said element including a first flange of annular form at the periphery thereof and a second flange which extends radially inward from said first flange,
    (e) means for securing the first flange of said ring-shaped element to the extreme outer end of the straight wall section of said hollow cylindrical member,
    (f) the second flange of said ring-shaped element defining an end wall of said housing with the opening therein functioning as the second outlet,
    (g) a valve member,
    (h) said second flange having outer and inner faces, means comprising said inner face functioning as a seat for said valve member when the latter is in its closed position,
    (i) means comprising first and second arms, said first arm including said valve member,
    (j) means for mounting said valve member within said space for pivotal movement to and from its closed position at the inner face of said second flange,
    (k) said valve member mounting means comprising a fixture about which said first and second arms are angularly movable, said fixture including a first part and said ring-shaped element including a second part at its exterior formed to receive and hold said first part when said first part is moved sideways with respect to said second part,
    (l) said second arm being disposed at the exterior of said housing and functioning as a lever for manually moving said valve member on said first arm to and from its closed position, and
    (m) said cylindrical member providing a path for liquid to enable liquid passing from the inlet to be divided and flow through both the first and second outlets when said valve member is moved toward its open position from its closed position at the inner face of said second flange, and to enable said valve member to be subjected to the pressure of the liquid in said space when it is moved to its closed position at the inner face of said second flange and all of the liquid flows from said space through said first outlet.

2. Valve structure as set forth in claim 1 in which a part of said first flange of said ring-shaped element and a part of the extreme outer end of the straight wall section of said cylindrical member telescopically fit one within the other, and means to limit the extent to which the aforementioned parts overlap when in telescopic relation with respect to one another.

References Cited

UNITED STATES PATENTS

| | | | |
|---|---|---|---|
| 2,147,289 | 2/1936 | Furedy | 222—556 |
| 2,216,531 | 10/1940 | Homeyer | 137—527.4 |
| 3,062,448 | 11/1962 | Read | 251—375 |

FOREIGN PATENTS 146,249  9/1951  Norway.

WILLIAM F. O'DEA, Primary Examiner.

H. M. COHN, Assistant Examiner.